Patented Mar. 24, 1931

1,797,559

UNITED STATES PATENT OFFICE

ORLAND R. SWEENEY, OF AMES, IOWA, ASSIGNOR TO IOWA STATE COLLEGE OF AGRICULTURE AND MECHANIC ARTS, OF AMES, IOWA, A CORPORATION OF IOWA

MOLDABLE PHENOLIC PENTOSAN MATERIAL

No Drawing.  Application filed June 16, 1924. Serial No. 720,453.

The object of my invention is to provide an inexpensive composition capable of being molded and being hard and strong and having a black shiny surface, which composition is insoluble in water and a non-conductor of electricity.

A further object is to provide a new method for the production of a moldable composition, which method is simple and inexpensive in its operation and may be commercially practiced without complicated or expensive apparatus.

My invention or discovery consists in combining a pentosan containing material with a phenol or phenolic material and subjecting them to the action of an acid to cause the pentosan containing material and the phenol to combine chemically into a black, sticky, tacky mass which on aging is capable of being molded to produce a shiny, hard composition, insoluble in water and a non-conductor of electricity.

I have successfully practiced my method and produced my moldable composition as follows:

I first reduce a definite quantity of corncobs, or other pentosan containing material, to sizes that will pass through a quarter inch mesh screen. I then thoroughly mix the ground corncobs with sixty percent of their weight of "crude cresylic acid" (cresol) and ten percent of their weight of hydrochloric acid (sp. gr. 1.18). The vessel in which these ingredients are contained is then covered and subjected to a heat of approximately 100° C. for three hours, at the end of which time it is formed into a black, sticky, tacky mass.

This mass is allowed to cool and age. After approximately forty-eight hours it is quite brittle and may then be ground into a fine powder. The resulting powder is then placed in moulds either at normal temperatures or it may be previously heated, and heat may if desired be applied to the moulds after the material is placed therein. The material is subjected to pressure while in the mould. The resultant articles are baked at a temperature under 100° C. for several days, gradually forming a hard insoluble body, having a black lustre. The articles thus produced are non-conductors of electricity.

These articles may be used commercially without the baking process, but unless baked they have a slight tendency to break down in water. The baking process, however, makes them insoluble in water.

In practice with my method the action of the acid element is thought to be catalytic in its nature and causes the pentosan, or possibly its decomposition products, and the phenol to combine chemically into the plastic material. The application of heat during the practice of the process simply accelerates the chemical combination of the pentosan and the phenol.

Some of the pentosan containing materials which I have successfully employed in the production of my improved moldable composition are corncobs, oat hulls, corn stalks, cotton seed hulls and peanut hulls. However, any other materials which contain pentosan may be successfully employed. In this connection, it should be explained that my method has nothing to do with the production of furfural, and in the practice of my method it is not thought that furfural enters into the reaction as an intermediate step.

By the term "pentosan containing material" employed herein, I wish to be understood as including such materials as corn cobs, oat hulls, corn stalks, cotton seed hulls, peanut hulls and the like, which contain a relatively large amount of pentosans as distinguished from such materials as wood, straw, hay and the like, which contain only a relatively small amount or trace of pentosans.

For the phenol element I have successfully employed crude cresylic acid, but obviously other phenolic bodies may be employed.

For the acid element I have successfully employed hydrochloric acid and sulphuric acid and various acid liberating substances, such for instance as sulphur monochloride and antimony chlorides.

My improved moldable composition may be produced very inexpensively as compared with the cost of production of other compositions having similar qualities, because the pentosan containing material is very inexpensive and can be obtained in large quantities in almost any locality. The phenol ingredient is also inexpensive and readily obtainable, and this is true also of the acid element.

Furthermore, the process of chemically combining these elements into the resultant product is very inexpensive, quickly accomplished and may be done with simple and inexpensive apparatus.

I claim as my invention:

The method of producing a moldable material, which comprises reacting a solid pentosan containing material and a phenol, the latter being in the proportion of approximately sixty per cent by weight of the pentosan containing material, in the presence of hydrochloric acid, the latter being in the proportion of approximately ten per cent by weight of the pentosan containing material, and then subjecting the mass to a temperature of approximately 100° C. for approximately three hours.

ORLAND R. SWEENEY.